(12) United States Patent
Manico et al.

(10) Patent No.: US 7,948,547 B2
(45) Date of Patent: May 24, 2011

(54) APPARATUS AND METHOD FOR CAPTURING AND VIEWING IMAGES

(75) Inventors: Joseph A. Manico, Rochester, NY (US); John N. Border, Walworth, NY (US)

(73) Assignee: Eastman Kodak Company, Rochester, NY (US)

( * ) Notice: Subject to any disclaimer, the term of this patent is extended or adjusted under 35 U.S.C. 154(b) by 373 days.

(21) Appl. No.: 12/186,193

(22) Filed: Aug. 5, 2008

(65) Prior Publication Data
US 2010/0033613 A1 Feb. 11, 2010

(51) Int. Cl.
*H04N 5/222* (2006.01)
*H04N 7/14* (2006.01)
*H04N 5/66* (2006.01)
*G09G 5/00* (2006.01)

(52) U.S. Cl. ........... 348/333.01; 348/333.02; 348/14.01; 348/14.03; 348/739; 345/1.1

(58) Field of Classification Search ............. 348/333.01, 348/333.02, 14.03, 14.07, 14.01, 552, 739, 348/841, 482, 480, 632, 42–60, 148, 143, 348/787, 789; 345/1.1, 3.1
See application file for complete search history.

(56) References Cited

U.S. PATENT DOCUMENTS

| | | | |
|---|---|---|---|
| 6,801,185 B2 * | 10/2004 | Salley | 345/102 |
| 7,042,486 B2 * | 5/2006 | Manico et al. | 348/61 |
| 7,283,854 B2 * | 10/2007 | Sato et al. | 455/575.3 |
| 7,352,415 B1 * | 4/2008 | Geronimi | 348/739 |
| 7,701,517 B1 * | 4/2010 | Geronimi | 348/739 |
| 7,714,923 B2 * | 5/2010 | Cok et al. | 348/333.01 |
| 2003/0030746 A1 | 2/2003 | Manico et al. | |
| 2003/0222833 A1 * | 12/2003 | Nakai | 345/1.1 |
| 2005/0024489 A1 * | 2/2005 | Fredlund et al. | 348/61 |
| 2005/0041009 A1 * | 2/2005 | Kuroda | 345/102 |
| 2005/0141063 A1 | 6/2005 | Nishino et al. | |
| 2006/0230659 A1 | 10/2006 | Hu | |
| 2006/0232672 A1 * | 10/2006 | Sim et al. | 348/148 |
| 2007/0206120 A1 * | 9/2007 | Nottage | 348/588 |
| 2008/0106628 A1 | 5/2008 | Cok et al. | |

* cited by examiner

*Primary Examiner* — Lin Ye
*Assistant Examiner* — Marly Camargo
(74) *Attorney, Agent, or Firm* — Raymond L. Owens

(57) ABSTRACT

A dual sided viewing panel and a method of capturing and displaying images, is disclosed. The dual sided viewing panel includes a first viewing panel and a second viewing panel. The first and second viewing panels are controllable by a control device to capture an image and display an image. The first and second viewing panels are positioned in an aligned back to back relationship to each other. In a method, a first image is captured by the first viewing panel and a second image is captured by the second viewing panel. The first captured image is displayed on the second viewing panel and the second captured image is displayed on the first viewing panel. The viewing direction of the first viewing panel is opposed to the viewing direction of the second viewing panel.

20 Claims, 3 Drawing Sheets

APPARATUS AND METHOD FOR CAPTURING AND VIEWING IMAGES

FIELD OF THE INVENTION

The present invention relates to an image capture and display device.

BACKGROUND OF THE INVENTION

Image capture and display devices are known that are able to capture an image and then display that image on a display panel. These devices may be generally known as a Display That Sees (DTS). These DTSs may, for example, simulate a mirror. The DTS captures the image of an object that is in front of the DTS and then displays the captured image on the DTS. Thus, in effect, the image of the object in front of the DTS is captured by the DTS and then "mirrored" back on the DTS by displaying the captured image on the DTS. However, with a DTS, as opposed to an actual mirror, the image in front of the DTS is electronically captured and then electronically displayed. This can provide utility since the electronically captured and displayed image can be processed such that modifications can be made to the electronic image. Of course, with a mirror, no such electronic modifications are possible.

Whereas DTSs are currently known for capturing and displaying an image in front of the DTS, the full range of possibilities for utilizing this technology has not been realized. Therefore, there is a need for an improved system and method that can more fully utilize the capabilities of the DTS technology.

SUMMARY OF THE INVENTION

In an embodiment of an apparatus of the present invention, a dual sided viewing panel is provided. The dual sided viewing panel includes a first viewing panel, where the first viewing panel is controllable to capture an image and display an image, and a second viewing panel, where the second viewing panel is also controllable to capture an image and display an image. The first and second viewing panels are positioned in an aligned back to back relationship to each other. A control device is provided for controlling the first and second viewing panels.

In an embodiment of a method of the present invention, a first image is captured by the first viewing panel and a second image is captured by the second viewing panel. The first captured image is displayed on the second viewing panel and the second captured image is displayed on the first viewing panel. The viewing direction of the first viewing panel is opposed to the viewing direction of the second viewing panel.

DETAILED DESCRIPTION OF THE INVENTION

Figure 1:
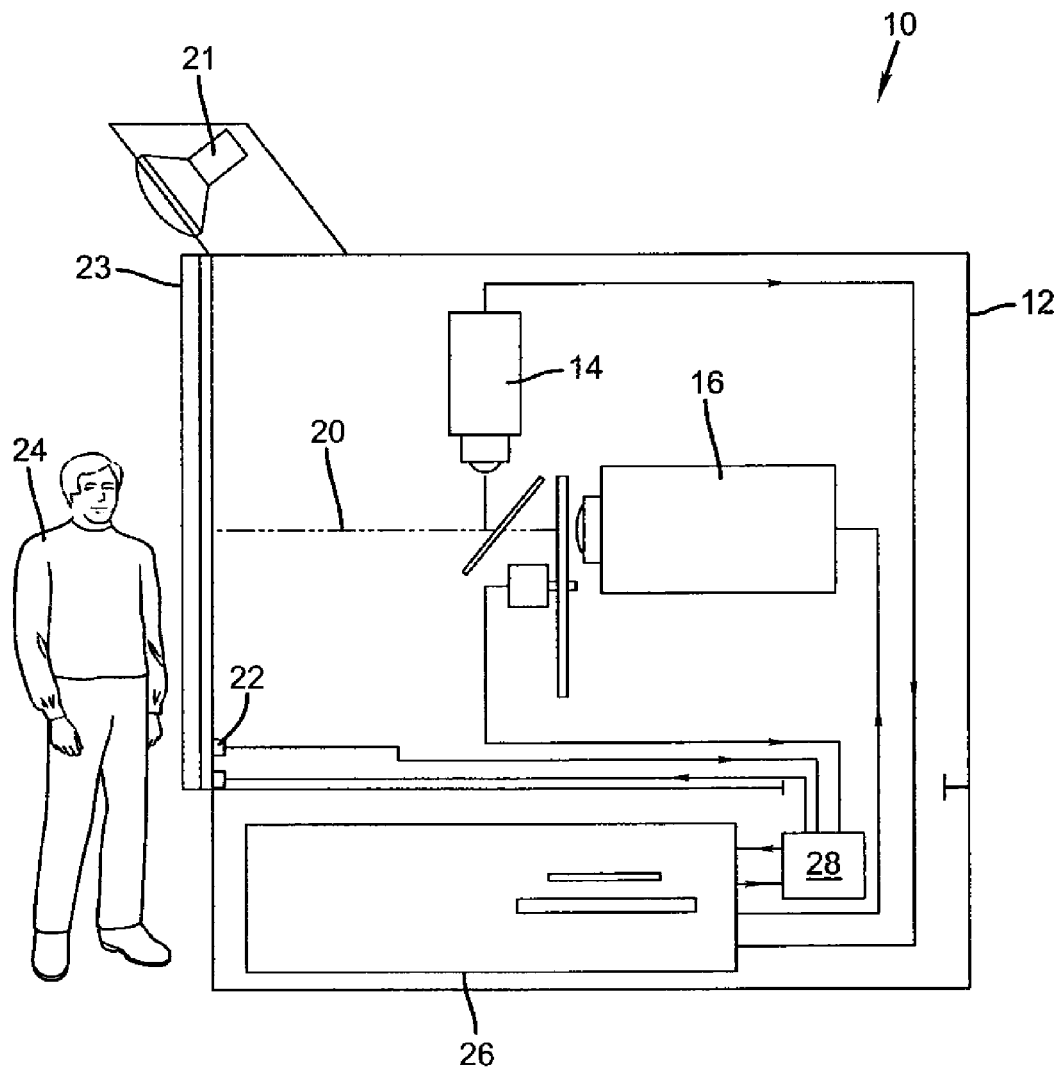
FIG. 1 illustrates a first embodiment of a viewing panel that may be used in the apparatus and method of the present invention.

FIG. 1 illustrates a first embodiment of a viewing panel that may be used in the apparatus and method of the present invention. Before describing the dual sided viewing panel and the method for capturing and displaying images in accordance with the principles of the present invention, a viewing panel will first be described.

FIG. 1 illustrates an embodiment of a viewing panel or an image capture and display device 10, which may also be referred to as a Display That Sees. As can be seen, the DTS 10 is housed in a cabinet 12. An electronic motion image camera 14 is utilized to capture the image of a subject 24 that is disposed in front of the DTS. The captured image may be a still image, e.g., a photograph, or a moving image, e.g., a movie clip. A digital image projector 16 is utilized to project the image captured by camera 14 onto a light valve projection screen 22 which is electronically switchable between a transparent state and a frosted state and which optionally includes a touch screen 23. The light valve projection screen 22 is located on a common optical axis 20 of the camera 14 and projector 16. The screen 22 allows the electronic camera 14 to capture the image of the subject 24 through the projection screen when in the transparent state and provides for displaying the captured image by the digital image projector 16 when in the frosted state.

The light valve projection screen 22 may comprise, for example, a liquid crystal film that changes state when an electrical current is applied. In the "power off" state, the material is "frosted" and suitable for rear projection. In the "power on" state, the material is clear and suitable for the camera to "see" through the material. A light 21 may be provided to illuminate the subject 24.

Control of the image capture and display device, and digital image processing, is provided by a computer 26, such as a standard micro-processor or personal computer, to which the output of the motion image camera 14 and the input to the digital projector 16 are connected. The computer 26 functions as both a controller and an image processing computer. It will be understood that a separate controller and digital image processing electronics can be provided. A digitally controlled driver 28 is provided for driving the light valve projection screen 22 to switch it back and forth between its transparent and frosted states.

In operation, the computer 26 first switches the light valve projection screen 22 to its transparent state by signaling driver 28 to energize the screen, then captures an image from camera 14, switches the light valve projection screen 22 to its frosted state, again via a signal to driver 28 to turn off the screen, making it frosted, and then projects the previously captured image onto the light valve screen 22 using the digital image projector 16. This cycle is then repeated 15 to 30 or more complete cycles per second to provide the appearance of a smooth and "flicker free" display. The captured images may be processed by the computer 26 prior to display using known image processing techniques. For example, the images may be geometrically distorted as in a fun house mirror. Alternatively, background scenes may be added using known blue screen techniques, colors may be modified, or pre-stored image elements, such as mustaches, hats, glasses, etc., may be digitally added. Also, articles of clothing may be added to the image of the subject, for example to show how the subject would appear in the article of clothing, e.g., as a mannequin.

The control of these different processing techniques may be provided by computer 26 and the application of the particular technique(s) may be directed by either internal inputs, e.g., the captured image, or by external inputs, e.g., voice or touch input, or input by movement of the subject of the captured image.

Additional features of the image capture and display device 10 of FIG. 1 are disclosed in U.S. Pat. No. 7,042,486, issued on May 9, 2006, to Manico et al., the entire disclosure of which is incorporated by reference herein.

Figure 2:
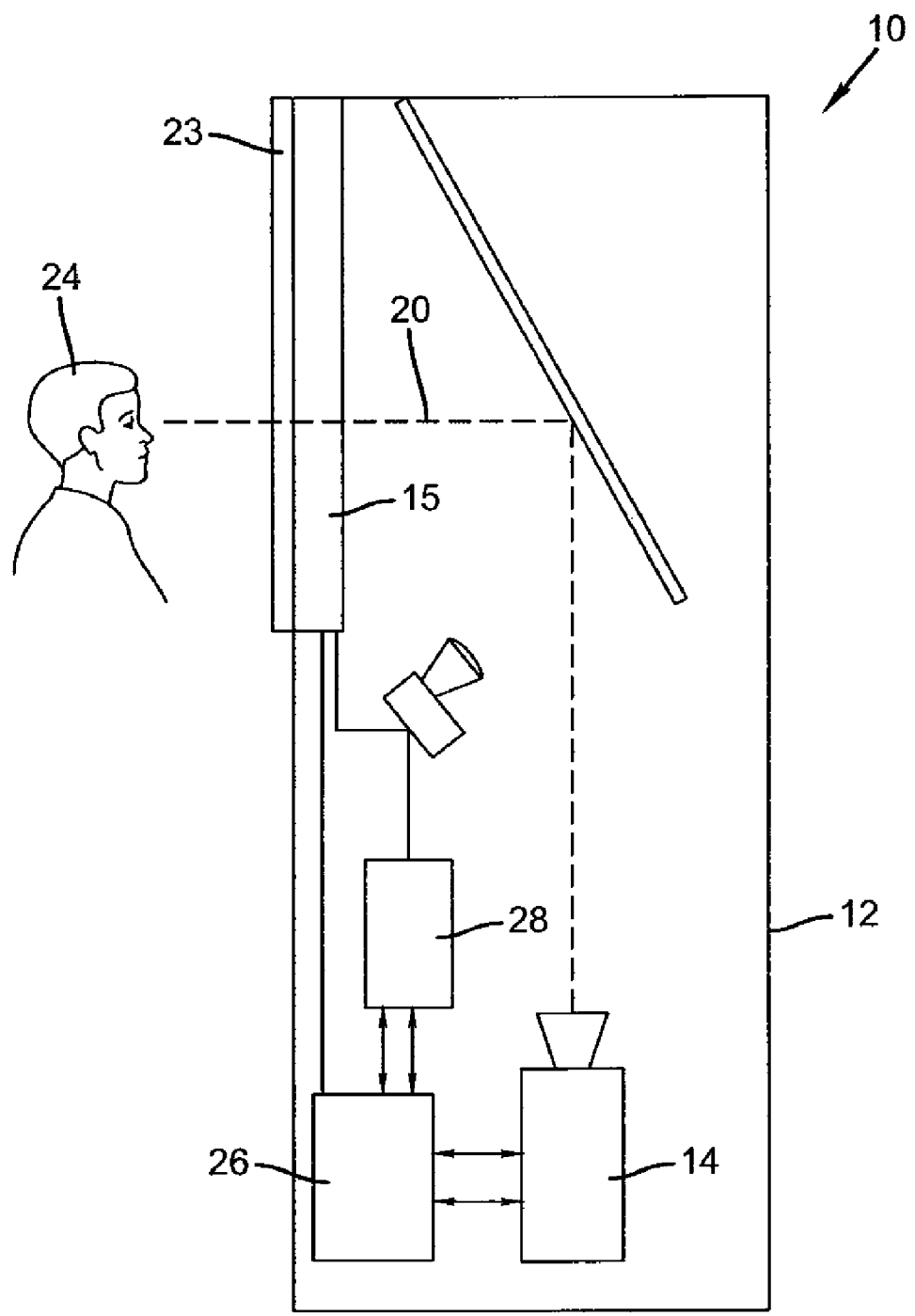
FIG. 2 illustrates a second embodiment of a viewing panel that may be used in the apparatus and method of the present invention.

FIG. 2 illustrates a second embodiment of a viewing panel that may be used in the apparatus and method of the present invention. For ease of reference, like reference numerals are utilized for the components in FIG. 2 that are common to the components of FIG. 1. As can be seen in FIG. 2, the image capture and display device (DTS) 10 may also be housed in a cabinet 12. An electronic camera 14 and a display panel 15 are provided. Display panel 15 is electronically switchable between a first state and a second state. In this embodiment of the DTS, display panel 15 may comprise, for example, a matrix of Organic Light Emitting Diodes (OLED) that change state when an electrical current is applied. In the "power off" state (transmissive state), the material is substantially transparent and suitable for viewing there through. In the "power on" state, the display panel 15 will display an image for viewing by an individual (viewer) 24 positioned in front of the display panel 15. An optional touch screen 23 may be provided over display panel 15. The touch screen 23 can be of the type having an array of infrared transmitters and detectors arranged around the periphery of the display panel 15, or a transparent pressure sensitive panel disposed over the display panel 15. The display panel 15 is located with respect to common optical axis 20 for allowing the electronic camera 14 to capture the image of the subject 24 through the display panel 15 when in the transparent state and for displaying an image by the digital display panel 15 for viewing by the individual (user) 24 along a viewing axis. Similar to the embodiment of FIG. 1, the DTS of FIG. 2 includes a computer 26 and a digitally controlled driver 28.

The embodiment of FIG. 2 is disclosed in U.S. Patent Application Publication No. US 2005/0024489, published on Feb. 3, 2005, and filed by Fredlund et al., the entire disclosure of which is incorporated by reference herein. In addition to the embodiment described above, U.S. Patent Application Publication No. US 2005/0024489 discloses additional embodiments for a DTS which also can be utilized in the apparatus and method of the present invention. For example, display panel 15 may be comprised of a liquid crystal display (LCD) in place of an OLED.

The present invention is not limited to any particular embodiment for a DTS for use in the present invention. Any of a variety of known, or contemplated, DTSs may be utilized without departing from the spirit and scope of the present invention. All that is required is that the DTS be able to capture an image and display the captured image.

Further, it is provided that the illustrations of the embodiments of the DTSs of FIGS. 1 and 2 are not drawn to scale. For example, the entire DTS may only be a few centimeters in width with the camera and projector being of such miniaturized design that they are able to be disposed within the DTS such that the DTS includes a thin cross-section, such as the cross-section of a pane of glass or a mirror. Thus, the digital image capture device and the projection device may be integrally formed in each of the first and second viewing panels such as in U.S. Patent Application Publication No. 2008/0106628, published on May 8, 2008, and filed by Cok et al., the entire disclosure of which is incorporated by reference herein. Additionally, the computer and driver can also be miniaturized such that they can be disposed within the DTS, or can even be disposed external to the DTS and electronically coupled to the camera and projector within the DTS. Thus, the present invention is not limited to any particular physical structure for the components of the DTS.

Figure 3:
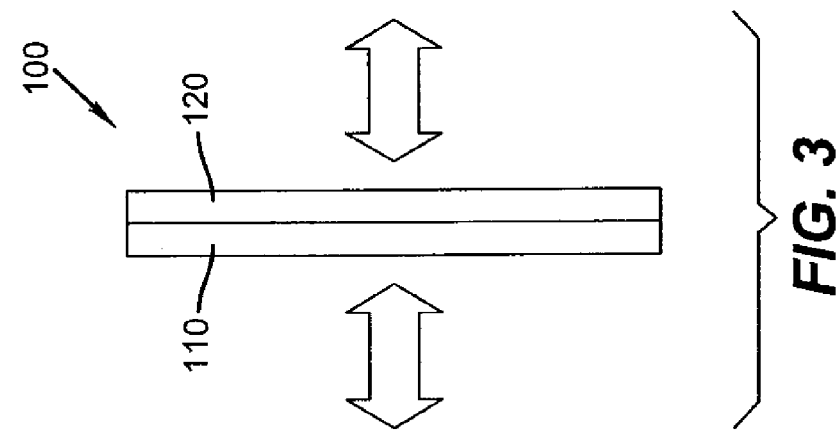
FIG. 3 illustrates a first embodiment of a dual sided viewing panel in accordance with the principles of the present invention.

FIG. 3 illustrates a first embodiment of a dual sided viewing panel 100 in accordance with the principles of the present invention. Dual sided viewing panel 100 includes a first viewing panel 110, or first DTS, and includes a second viewing panel 120, or second DTS. As discussed previously, both the first viewing panel 110 and the second viewing panel 120 are controllable to both capture an image and display an image. Thus, first viewing panel 110 and second viewing panel 120 can each be comprised of any of the disclosed embodiments, or contemplated embodiments, for a DTS.

As can be understood, first viewing panel 110 can be utilized to capture an image that is disposed in front of first viewing panel 110. The double arrow illustrates the viewing directions associated with first viewing panel 110. Therefore, an object in front of first viewing panel 110 (to the left of first viewing panel 110) can be captured by first viewing panel 110 and the captured image can be displayed on the forward facing surface of first viewing panel 110 (the left facing surface of first viewing panel 110).

Similarly, second viewing panel 120 can capture an image disposed in front of second viewing panel 120 (to the right of second viewing panel 120). Second viewing panel 120 is then able to project the captured image on the front side of the second viewing panel 120 (the side facing to the right).

As can be seen in FIG. 3, in accordance with the principles of the present invention, the first viewing panel 110 and the second viewing panel 120 are positioned in an aligned back to back relationship to each other. The aligned position refers to the optical axis for capturing and viewing of first viewing panel 110 being aligned with the optical axis for capturing and viewing of second viewing panel 120. This alignment feature of the present invention will be discussed in further detail below. In the embodiment of FIG. 3, the backs of the respective viewing panels are disposed adjacent to each other such that the display screens of each viewing panel are opposed from each other and faced in opposite directions. Thus, the display screen of first viewing panel 110 faces to the left and the display screen of second viewing panel 120 faces to the right. As discussed previously, both the first and second viewing panels are controllable to capture an image and display an image and a control device is included for controlling the first and second viewing panels.

In accordance with the principles of the present invention, placing DTS 110 and DTS 120 in a back to back relationship to each other provides a fuller range of possibilities for utilizing the DTS technology. With the configuration of the present invention, not only can one DTS capture an image in front of the DTS and display that image on the viewing panel of that DTS, but additionally, that DTS can provide the captured image to the second DTS for displaying on the viewing panel of that opposite facing DTS. In this manner, a viewer that is looking at a DTS on one side of the DTS can actually "see" an image that is captured on the other side of the DTS by the DTS that is on the opposing side and which DTS provides the opposing side image to the DTS that the viewer is viewing.

For example, first viewing panel 110 is able to capture an image that is in front of first viewing panel 110. First viewing panel 110 is then able to not only display that captured image on its display panel, but additionally, provide that captured image to second viewing panel 120 for display on the display panel of the second viewing panel. Second viewing panel 120 can operate similarly. Thus, as can be understood, a captured image on one side of the dual sided viewing panel 100 can be provided to the opposing side of the dual side viewing panel.

This feature of the present invention has numerous useful applications. For example, dual sided viewing panel 100 can be utilized such that it operates as a window pane. In FIG. 3, a viewer to the left side of dual sided viewing panel 100 can see objects on the right side of dual sided viewing panel 100 when second viewing panel 120 captures an image on the right side and provides it to first viewing panel 110 for display on the left side. In effect, the viewer to the left side of dual sided viewing panel 100 is peering "through" the dual sided viewing panel 100 to see what is on the opposing side of dual sided viewing panel 100. This provides particular utility when considering that the functionality of a window can be provided, however, drawbacks with respect to utilizing a window pane are avoided, e.g., breakability of the window, minimal physical security, privacy, etc.

Further in accordance with the principles of the present invention, not only can the captured image from one side of the dual sided viewing panel 100 be projected on the opposing side of the dual sided viewing panel, but additionally, that projected image can be manipulated by the electronics of the dual sided viewing panel such that the image that is displayed to the viewer can be controlled depending upon the requirements of any particular application with which the dual sided viewing panel is utilized. For example, additional scenes can be provided on the projected image, a false image can be provided for security purposes, and the image can be manipulated to change its characteristics.

Figure 5:
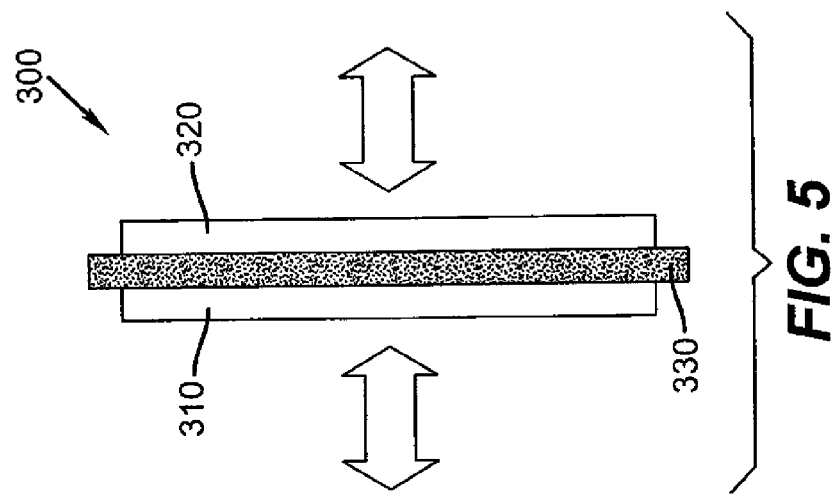
FIG. 5 illustrates a third embodiment of a dual sided viewing panel in accordance with the principles of the present invention.
Figure 4:
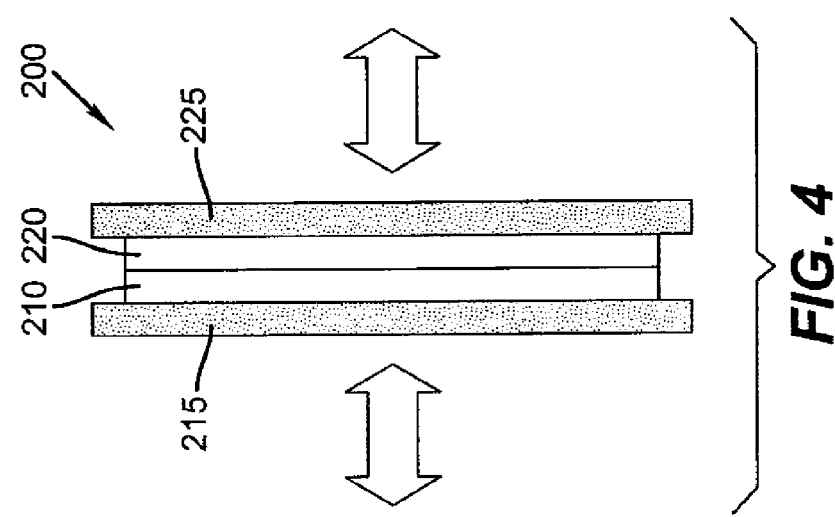
FIG. 4 illustrates a second embodiment of a dual sided viewing panel in accordance with the principles of the present invention.

FIG. 4 and FIG. 5 illustrate further embodiments of the dual sided viewing panel of the present invention. In FIG. 4, the dual sided viewing panel 200 again includes first viewing panel 210 and second viewing panel 220, which operate as discussed previously. However, in this embodiment, outer protective panels 215 and 225 are provided on the outward facing surfaces of the first and second viewing panels. These protective panels 215 and 225 are generally transparent such that images can be both captured and displayed on the viewing panels, however, the protective panels are of sufficient strength to protect the viewing panels from, e.g., physical damage, pressure forces, environmental effects, etc. Additionally, the panels may provide for additional or alternative effects, e.g., be shaded to provide coloring effects, include static images, etc.

Similarly, in the embodiment of FIG. 5, an intermediate panel 330 is provided between first viewing panel 310 and second viewing panel 320. This intermediate panel 330 can be provided for a variety of purposes that are not connected to image capture or display such as security, thermal insulation, sound insulation, radiation barrier or other protective purposes, such as, for example, providing a non-penetrable barrier between the two viewing panels or simply a space that is not meant to be seen. In an application where the dual sided viewing panel 300 is being utilized as a store front window, for example, the intermediate panel can provide for additional physical security over and above what a normal window pane could provide. Additional applications such as for a U.S. Defense Department-related "window" or a law enforcement "window" can be contemplated for this embodiment. However, even with this enhanced security feature, as described previously, the dual sided viewing panel 300 could still provide the same functionality of a window pane such that a person on the left side of the dual sided viewing panel 300 could see what was occurring on the right side of the dual sided viewing panel 300 and, similarly, a viewer on the right side of the dual sided viewing panel 300 could see what was occurring on the left side of the dual sided viewing panel 300.

As can be understood, and as discussed above in the context of the several examples, the dual sided viewing panel can provide many possibilities for further utilizing the DTS technology. As discussed, the dual sided viewing panel can be utilized as a window replacement. The "window" can be utilized for any of a variety of purposes including security, advertising, entertainment, and decorative applications, which will be further briefly discussed below.

Further with respect to security, the image displayed on the DTS can be an image that is altered from the image that is captured on the opposing side of the DTS or the displayed image can be a false image. In this manner, the viewer thinks that he/she is viewing what is occurring on the opposing side of the "window", however, the viewer is actually only viewing a false or manipulated image from that which is actually occurring on the opposing side of the dual sided viewing panel.

The dual sided viewing panel of the present invention can also have utility in an advertising context. For example, if a viewer is looking into a store front "window" that is actually a dual sided viewing panel, the dual sided viewing panel can additionally capture the image of the viewer and manipulate the image such that it is projected back to the viewer in an altered state. The altered state, for example, could be a use of the viewer's image as a mannequin where the viewer's image has been manipulated to display the image with an object that is also displayed in the "store front window". Thus, a "virtual mannequin" could be displayed where apparel for sale, as displayed in the store front window, could be projected onto the image of the viewer, i.e., the virtual mannequin. This virtual mannequin could be displayed in real time. Additionally in this context, a viewer on the opposing side of the dual sided viewing panel, e.g., a shop owner within the "store", could view the "window" shopper.

In another contemplated application, the dual sided viewing panel can be used as a substitute for a wall(s) that is generally used to enclose, for example, an office cubicle. Thus, a wall would still be in existence to provide privacy and security to the occupant, however, the occupant would have the more pleasant experience of thinking that either no wall whatsoever was in place or that they are looking out of a full-panel window, such as in a corner office, instead of looking at a wall. This effect is achieved since, as discussed previously, images from the opposing side of the dual sided viewing panel can be displayed to the occupant on the internal side of the dual sided viewing panel. Or, alternately, the office cubicle can be located between the first viewing panel 310 and the second viewing panel 320 in the intermediate panel 330 such that viewers of the first viewing panel 310 or viewers of the second viewing panel 320 would appear to see through the office cubicle. Similarly, blank entertainment screens in a home can be covered by a dual sided viewing panel such that the area of the screen now appears to be a window or may include any image that can be projected on the dual sided viewing panel.

The feature of the invention where both the first viewing panel and the second viewing panel are positioned in optical alignment in a back to back relationship provides for further utility. Thus, an image on one side of the dual sided viewing panel that is captured and displayed on the opposing side of the dual sided panel appears on axis with respect to the frame of reference of the viewer since the optical axes of both viewing panels are aligned. If the axes were not aligned, a captured image from one side of the dual sided viewing panel that is displayed on the opposing side of the dual sided viewing panel would not appear to be a true image that is viewed by the viewer "through" the dual sided panel.

This optical alignment also provides for greater interactivity between images captured on one side of the dual sided viewing panel and displayed on the opposing side of the dual sided viewing panel. For example, by capturing an on-axis image from one side of a viewing panel and displaying it on-axis on an opposing side of the dual side viewing panel, and vise versa, viewers on both sides of the dual sided viewing panel can sense that they are physically interacting with the activity on the opposing side. For example, viewers on opposing sides of the dual sided viewing panel can appear to be interacting with each other, such as in playing tennis. An image of a viewer striking the ball on one side is displayed on-axis to the viewer on the other side. The viewer on the other side then can strike the ball of the displayed image. This image is then captured and displayed on the opposing side of the dual sided viewing panel for similar striking by the opposing viewer.

Additionally in this manner, what occurs on one side of the dual sided viewing panel may control what occurs on the other side of the dual sided viewing panel. For example, for a particular image that is captured on one side of the viewing panel, this captured image may be utilized to control which image is captured or displayed on the opposing side. Likewise, for a particular image that is displayed on one side of the dual sided viewing panel, this displayed image may be utilized to control which image is captured or displayed on the opposing side. Similarly, the first and second viewing panels may include sound and touch sensors that may also be utilized to control which images are captured and displayed on either of the sides of the dual sided viewing panel. Additionally, the sound sensor may also include a sound producing device to add sound to the presentation of the panels to enhance the display of images on the viewing panels. Thus, with respect to the control of the viewing panels, because images are captured and displayed, and may be manipulated, many possibilities exist for the control of which particular images are captured and displayed and how this control may be implemented, e.g., touch, sound, image capture, image display, etc. These inputs may be provided to the control device which, responsive to the inputs, captures and/or displays images in accordance with processing instructions.

Whereas the dual sided viewing panel has been discussed primarily in the context of large panels, e.g., windows, display screens, and walls, the present invention is not limited to only being used in such contexts. The present invention can be utilized in any context where it is desirable to capture an image on one side of the dual sided viewing panel and display the captured image on an opposing side of the dual sided viewing panel. Additionally, the present invention can be utilized in any context where control of the captured images and projected images is desirable to achieve additional functionality. For example, the dual sided viewing panel can be utilized as a Graphical User Interface (GUI) where the manipulation of the interface by a user causes images to be captured and displayed. Further with the use as a GUI, the cameras that are used to capture images can also be used to detect, for example, hand/finger positions, facial expressions, lip movements, body positions and movements, etc., and the displays can provide feedback via virtual objects such as a pointer or cursor that can be directed by the user with the GUI. Thus, with use as a GUI, the user is able to provide input and control while the system can provide appropriate feedback, e.g., image capture/detect and image display, based upon the particular requirements of the application of the GUI.

Additionally, the dual sided viewing panel can be incorporated into a cell phone application or any hand held viewing device where it is desirable to capture images from one side of the device and display them on an opposing side of the device. The present invention is not limited to any context in which the dual sided viewing panel can be incorporated. The examples discussed herein for the uses of the dual sided viewing panel are only but a few of the many applications into which the present invention may be incorporated. The present invention can be utilized in any of a multiplicity of applications that can be contemplated.

The invention has been described in detail with particular reference to certain preferred embodiments thereof, but it will be understood that variations and modifications can be effected within the spirit and scope of the invention.

PARTS LIST 10 image capture and display device
12 cabinet
14 electronic motion image camera
15 display panel
16 digital image projector
20 common optical axis
21 light
22 light valve projection screen
23 touch screen
24 subject
26 computer
28 digitally controlled driver
100 dual sided viewing panel
110 first viewing panel
120 second viewing panel
200 dual sided viewing panel
210 first viewing panel
215 outer protective panel
220 second viewing panel
225 outer protective panel
300 dual sided viewing panel
310 first viewing panel
320 second viewing panel
330 intermediate panel

The invention claimed is:

1. A dual sided image capture and display device comprising,
a first image capture and display device having a first viewing panel and an associated first image capture device, wherein the first image capture and display device is controllable to capture an image and display an image;
a second image capture and display device having a second viewing panel and an associated second image capture device, wherein the second viewing panel is controllable to capture an image and display an image;
means for optically aligning and integrating the first and second viewing panels to provide a common optical axis to the first and the second image capture devices and wherein the first and the second viewing panels are positioned in an aligned back to back relationship to each other; and
a control device for controlling the first and second image capture and display devices so that an image captured by either image capture device can be shown on the first or second viewing panels.

2. The dual sided image capture and display device according to claim 1, wherein an intermediate panel is positioned between the first and second viewing panels.

3. The dual sided image capture and display device according to claim 1, further comprising an audio sensor for capturing and/or producing sound coupled to the first and second viewing panels.

4. The dual sided image capture and display device according to claim 1, wherein an outer protective panel is positioned outward of each of the first and second viewing panels.

5. The dual sided image capture and display device according to claim 1, wherein a digital image capture device is integrally formed in each of the first and second viewing panels for capturing an image in front of the respective viewing panel.

6. The dual sided image capture and display device according to claim 5, wherein the digital image capture device is positioned with respect to the respective image capture and display device so as to capture the image along an axis which is in a substantial alignment with a viewing axis of the image capture and display device.

7. The dual sided image capture and display device according to claim 5, wherein the image captured by the digital image capture device of the first or second image capture and display device is used to control the first and/or second image capture and display device.

8. The dual sided image capture and display device according to claim 7, wherein the control comprises controlling a capture of an image by the first and/or second image capture and display device.

9. The dual sided image capture and display device according to claim 7, wherein the control comprises controlling a display of an image on the first and/or second image capture and display device.

10. The dual sided image capture and display device according to claim 1, wherein a sensor associated with the first and/or second image capture and display device is used to control the first and/or second image capture and display device.

11. A method for capturing and displaying images, comprising the steps of:
optically aligning and integrating the first and the second image capture and display devices;
capturing a first image by the first image capture and display device; capturing a second image by the second image capture and display device;
displaying the first captured image on the second image capture and display device; and
displaying the second captured image on the first image capture and display device;
wherein the first and second image capture and display devices are positioned in an aligned back to back relationship to each other to provide a common optical axis and wherein a first viewing direction of the first image capture and display device is opposed to a second viewing direction of the second image capture and display device.

12. The method according to claim 11, wherein an intermediate panel is positioned between the first and second image capture and display devices.

13. The method according to claim 11, further comprising the step of producing a sound by an audio mechanism coupled to the first and/or second image capture and display devices.

14. The method according to claim 11, wherein an outer protective panel is positioned outward of each of the first and second image capture and display devices.

15. The method according to claim 11, wherein the steps of capturing the first and second images is performed by a digital image capture device integrally formed in each of the first and second image capture and display devices.

16. The method according to claim 15, wherein the digital image capture device is positioned with respect to the respective image capture and display device so as to capture the image along an axis which is in a substantial alignment with a viewing axis of the image capture and display device.

17. The method according to claim 11, further comprising the step of controlling the steps of capturing and displaying by a control device.

18. The method according to claim 11, wherein the step of capturing the second image is controlled based on the step of capturing the first image.

19. The method according to claim 11, wherein the step of displaying the second image is controlled based on the step of displaying the first image.

20. The method according to claim 11, further comprising the steps of:
displaying the first captured image on the first image capture and display device; and
displaying the second captured image on the second image capture and display device.

* * * * *